United States Patent
Gopinath et al.

(10) Patent No.: US 8,001,142 B2
(45) Date of Patent: Aug. 16, 2011

(54) DISTRIBUTED DATA SYSTEM WITH INCREMENTAL DATA UPDATES

(75) Inventors: Pramod Gopinath, Union City, CA (US); Darpan Dinker, San Jose, CA (US); Mahesh Kannan, San Jose, CA (US); Suveen R. Nadipalli, Sunnyvale, CA (US)

(73) Assignee: Oracle America, Inc., Redwood City, CA (US)

( * ) Notice: Subject to any disclaimer, the term of this patent is extended or adjusted under 35 U.S.C. 154(b) by 2433 days.

(21) Appl. No.: 10/405,760

(22) Filed: Apr. 2, 2003

(65) Prior Publication Data

US 2004/0199486 A1    Oct. 7, 2004

(51) Int. Cl.
G06F 17/30    (2006.01)
G06F 7/00    (2006.01)

(52) U.S. Cl. .................. 707/770; 707/802; 709/202

(58) Field of Classification Search ............... 707/1–10, 707/200–205, 770, 802, 999.01; 705/1; 709/200–250
See application file for complete search history.

(56) References Cited

U.S. PATENT DOCUMENTS

| | | | |
|---|---|---|---|
| 5,454,108 A | 9/1995 | Devarakonda et al. |
| 5,634,122 A | 5/1997 | Loucks et al. |
| 5,666,486 A | 9/1997 | Alfieri et al. |
| 5,684,807 A | 11/1997 | Bianchini et al. |
| 5,812,780 A | 9/1998 | Chen et al. |
| 5,852,747 A | 12/1998 | Bennett et al. |
| 5,913,213 A | 6/1999 | Wikstrom et al. |
| 5,951,694 A | 9/1999 | Choquier et al. |
| 6,002,868 A | 12/1999 | Jenkins et al. |
| 6,006,259 A | 12/1999 | Adelman et al. |
| 6,032,216 A | 2/2000 | Schmuck et al. |
| 6,067,559 A | 5/2000 | Allard et al. |
| 6,097,380 A | 8/2000 | Crites et al. |
| 6,108,699 A | 8/2000 | Moiin |
| 6,167,490 A | 12/2000 | Levy et al. |
| 6,175,931 B1 | 1/2001 | Hornung |
| 6,192,401 B1 | 2/2001 | Modiri et al. |
| 6,249,879 B1 | 6/2001 | Walker et al. |
| 6,324,492 B1 | 11/2001 | Rowe |
| 6,330,689 B1 | 12/2001 | Jin et al. |
| 6,477,172 B1 | 11/2002 | Burger et al. |
| 6,480,473 B1 | 11/2002 | Chambers et al. |
| 6,512,740 B1 | 1/2003 | Baniewicz et al. |

(Continued)

OTHER PUBLICATIONS

"Concurrency Service Specification," Published Apr. 2000, Object Management Group.

(Continued)

*Primary Examiner* — Shew-Fen Lin
(74) *Attorney, Agent, or Firm* — Robert C. Kowert; Meyertons, Hood, Kivlin, Kowert & Goetzel, P.C.

(57) ABSTRACT

A system may include a client and a distributed data manager coupled to the client. The distributed data manager may include a data store storing a data object that includes several sub-elements. The client is configured to update a portion of the data object by sending a message to the distributed data manager. The message specifies one of the sub-elements of the data object to be updated and includes a new value of that sub-element but does not include a new value of the entire data object. The distributed data manager is configured to perform updates to the data object in the data store dependent on which of the sub-elements of the data object are specified by the client.

24 Claims, 12 Drawing Sheets

U.S. PATENT DOCUMENTS

| | | |
|---|---|---|
| 6,522,995 B1 | 2/2003 | Conti et al. |
| 6,532,494 B1 | 3/2003 | Frank et al. |
| 6,567,808 B1 | 5/2003 | Eschelbeck et al. |
| 6,574,197 B1 | 6/2003 | Kanamaru et al. |
| 6,591,295 B1 * | 7/2003 | Diamond et al. ............. 709/217 |
| 6,718,394 B2 | 4/2004 | Cain et al. |
| 6,748,429 B1 | 6/2004 | Talluri et al. |
| 6,748,554 B2 * | 6/2004 | Jin et al. ........................... 714/15 |
| 6,801,937 B1 | 10/2004 | Novaes et al. |
| 6,816,905 B1 | 11/2004 | Sheets et al. |
| 6,820,210 B1 | 11/2004 | Daruwalla et al. |
| 6,847,993 B1 | 1/2005 | Novaes et al. |
| 6,895,401 B2 * | 5/2005 | Skinner et al. .................... 707/1 |
| 6,920,474 B2 | 7/2005 | Walsh et al. |
| 6,928,378 B2 | 8/2005 | Lebee et al. |
| 6,944,788 B2 | 9/2005 | Dinker et al. |
| 6,961,769 B2 | 11/2005 | Arora et al. |
| 2001/0010053 A1 | 7/2001 | Ben-Shachar et al. |
| 2001/0014097 A1 | 8/2001 | Beck et al. |
| 2001/0027453 A1 * | 10/2001 | Suto ................................. 707/10 |
| 2001/0040895 A1 | 11/2001 | Templin |
| 2002/0042693 A1 | 4/2002 | Kamp et al. |
| 2002/0062372 A1 | 5/2002 | Hong et al. |
| 2002/0073080 A1 * | 6/2002 | Lipkin ............................... 707/3 |
| 2002/0091750 A1 | 7/2002 | Kasaravalli et al. |
| 2002/0143958 A1 | 10/2002 | Montero et al. |
| 2002/0152307 A1 | 10/2002 | Doyle et al. |
| 2003/0110445 A1 | 6/2003 | Khaleque |
| 2003/0131041 A1 | 7/2003 | Dinker et al. |
| 2003/0154202 A1 | 8/2003 | Dinker et al. |
| 2003/0204509 A1 | 10/2003 | Dinker et al. |
| 2003/0204623 A1 | 10/2003 | Cain |
| 2003/0204786 A1 | 10/2003 | Dinker et al. |
| 2004/0044672 A1 * | 3/2004 | Spencer, Jr. ................... 707/100 |
| 2004/0059805 A1 | 3/2004 | Dinker et al. |
| 2004/0066741 A1 | 4/2004 | Dinker et al. |
| 2004/0098490 A1 | 5/2004 | Dinker et al. |
| 2004/0103098 A1 * | 5/2004 | Mitra ............................... 707/10 |
| 2004/0162885 A1 * | 8/2004 | Garg et al. ..................... 709/213 |
| 2004/0199815 A1 | 10/2004 | Dinker et al. |

OTHER PUBLICATIONS

Devarakonda, Murthy et al., "Recovery in the Calypso Filesystem," ACM Transactions on Computer Systems, vol. 14, No. 3, Aug. 1996, pp. 287-310.

\* cited by examiner

Message 20

URL 22: {Data Manager 22A} / {ID 22B} / {Unique Data Key 22C}

URI 24

Operation Flag 26

Data 28

FIG. 4

Message:
('HttpSession', '/ID_1', 'insert', null)

Data Decomposition:

HttpSession
  |
  ID_1

FIG. 5A

Messages:
('HttpSession', '/ID_1', 'delete', null)
('HttpSession', {'/ID_1', '/ID_1/SC-1', '/ID_1/SC-2'}, {'insert', 'insert', 'insert'},
 {'', '<value1>', '<value2>'})

Data Decomposition:

HttpSession
  |
  ID_1
 /    \
SC-1   SC-2
 |      |
<value1> <value2>

FIG. 5B

DISTRIBUTED DATA SYSTEM WITH INCREMENTAL DATA UPDATES

BACKGROUND

1. Field of the Invention

The present invention relates to distributed data systems and, more particularly, to performing data updates in distributed data systems.

2. Description of Related Art

Distributed data systems manage data owned by members of a distributed system formed in a network. By managing the data, a distributed data system provides abstraction of data locality to data users, or clients, that are connected to member systems, or nodes, of the distributed system. Fault tolerance can be provided by clustering a distributed data system so that there are multiple nodes to perform each function of the distributed data system. A distributed data system may provide high availability by replicating or distributing data throughout such a cluster. Each node in a cluster may have one or more clients depending on the topology of the cluster and its configuration.

FIG. 1 illustrates one distributed data system configuration in which distributed data manager nodes 111 are coupled to each other and to clients 101. Each distributed data manager 111 includes a data store 121 providing data storage for distributed data within the distributed data system.

Each distributed data manager node 111 may operate on a different machine in a network. Each client 101 may communicate with an associated distributed data manager node 111 (e.g., a client 101 may communicate with a distributed data manager node 111 executing on the same machine). As needed, a distributed data manager node (e.g., 111A) may communicate with the other distributed data manager nodes (e.g., 111B-111D) in the cluster to respond to clients and to perform distributed data functions (e.g. replication, load balancing, etc.). For example, when client 101B1 generates data, client 101B1 may send the data to distributed data manager 111B. Distributed data manager 111B may then store the data in its data store 121B and transmit the data to another node 111C in the cluster to provide a back-up at a remote location. When client 101B1 accesses data, the client may request the data from distributed data manager 111B. If the requested data is present in the data store 121B, distributed data manager 111B returns the requested data to the client 101B1. Otherwise, the distributed data manager 111B requests the data from another distributed data manager in the cluster such as distributed data manager 111C. When the other distributed data manager 111C finds the requested data, that distributed data manager 111C transmits the requested data to the requesting distributed data manager 111B. The requesting distributed data manager 111B then stores the data in its data store 121B and transmits the requested data to the client 101B1.

In an out-of-process configuration, data crosses process boundaries when transmitted between different distributed data managers 111 or between distributed data managers 111 and clients 101. To transmit data across process boundaries, data is serialized before transmission, transmitted and received in its serialized format, and de-serialized at the receiving end.

In an in-process configuration, certain clients 101 share process space with certain distributed data managers 111 (e.g., a client may share process space with a distributed data manager executing on the same machine as the client). Data crosses process boundaries when transmitted between components in different processes (e.g., different distributed data managers 111) but not when transmitted between components within the same process (e.g., clients in the same process as the distributed data manager with which those clients are communicating). Therefore, although serialization and de-serialization take place across process boundaries in the in-process configuration, data may be communicated between a distributed data manager and a client sharing the same process space without the additional computation requirement for serialization/de-serialization.

Serializing data involves collecting data into transmittable data. For example, serialization may include generating object data sequentially so that the object data may be transmitted as a data stream. The serialized data represents the state of the original data in a serialized form sufficient to reconstruct the object. De-serializing involves producing or reconstructing the original object data from its serialized format. As the complexity of a data object increases, the complexity of serializing and de-serializing that data object also increases. For example, it may take longer to process data objects that have associated attributes, variables, and identification of methods and/or classes than to process more primitive data objects.

As the above examples show, serialization and de-serialization may be performed frequently in a distributed data system. The process of serializing and de-serializing data may consume more system resources than is desirable, especially as the data becomes more complex. Furthermore, the transmission of the data between nodes may cause an undesirable amount of network traffic. Accordingly, improved methods of communicating data between processes are desired.

SUMMARY

Various embodiments of systems and methods for performing incremental data updates in a distributed data system are disclosed. In one embodiment, a system may include a client and a distributed data manager coupled to the client. The distributed data manager may include a data store storing a data object that includes several sub-elements. The client is configured to update a portion of the data object by sending a message to the distributed data manager. The message specifies one of the sub-elements of the data object to be updated and includes a new value of that sub-element but does not include a new value of the entire data object. The distributed data manager is configured to perform updates to the data object in the data store dependent on which of the sub-elements of the data object are specified by the client. Such a system may include an additional distributed data manager that stores a replicated copy of the data object in its data store. In response to updating the data object, the distributed data manager may send an additional message specifying the sub-elements of the data object to be updated to the additional distributed data manager. The additional message includes the new value of the sub-element but does not include a new value of the entire data object. The additional distributed data manager may be configured to update the sub-element included in the replicated copy of the data object in response to receiving the additional message.

In one embodiment, the distributed data manager may operate in a different process than the client. The distributed data manager may use information included in the message to select one of several data-type-specific data managers to handle the message. In such an embodiment, the selected data-type-specific data manager is configured to access the data object in serialized form in the data store. If instead the distributed data manager operates in the same process as the client, the selected data-type-specific data manager is configured to access the data object in the data store in a non-serialized form (e.g., as a value or an object reference).

The client may be configured to encode a URL (Uniform Resource Locator) in the message. The distributed data manager may be configured to use information included in the URL to select one of the data-type-specific data managers to handle the message. In one embodiment, the URL may include a data manager identifier, a session identifier, and a unique data key. In some embodiments, the URL may identify the data object.

The client may be configured to encode a URI (Uniform Resource Identifier) in the message. The distributed data manager may be configured to use the URI to identify which one of the sub-elements of the data object to update in response to the message. The client may also be configured to encode an operation flag in the message. The distributed data manager may be configured to use the operation flag to select a type of access (e.g., create, update, or delete) to perform to the specified sub-element of the data object.

In one embodiment, a method may involve: a client sending a message to a distributed data manager requesting that a portion of a data object be updated, where the message specifies less than all of the data object and a new value of the portion of the data object to be updated; and the distributed data manager updating the data object dependent on which of the sub-elements are identified in the message.

In some embodiments, a computer accessible medium may store program instructions computer executable to implement a distributed data manager configured to: receive a message requesting an update of a data object from a client, where the message specifies one of several sub-elements of the data object to be updated and a new value of that sub-element (as opposed to a new value of the entire data object); and in response to the message, perform the update to the data object dependent on which sub-elements of the data object are specified in the message.

In some embodiments, a computer accessible medium may store program instructions computer executable to implement a distributed data system client that is configured to: subdivide a data object stored by a distributed data system into a several sub-elements; encode information identifying one of the sub-elements and a new value of the identified sub-element in a message requesting an update of the data object; and send the message requesting the update of the data object to the distributed data system.

In some embodiments, a distributed data system may include a client and a distributed data manager coupled to the client. The distributed data manager includes a data store, which stores a data object that includes several sub-elements. The distributed data manager also includes several data-type-specific data managers, which are each configured to handle a specific type of data object. The client is configured to access the data object by sending a message to the distributed data manager. The message specifies which one of the sub-elements of the data object should be accessed. The distributed data manager is configured to use information included in the message to select one of the data-type-specific data managers to handle the message. The selected data-type-specific data manager is configured to responsively access the specified sub-element of the data object. In one embodiment, the distributed data system manager may be included in an application server, and the client may be a web server coupled to the application server.

BRIEF DESCRIPTION OF THE DRAWINGS

A better understanding of the present invention can be obtained when the following detailed description is considered in conjunction with the following drawings, in which:

FIG. 4 illustrates an exemplary message format that may be used to communicate between clients and distributed data managers in one embodiment.

FIGS. 5A-5D show exemplary messages that may be sent requesting incremental data updates, according to one embodiment.

While the invention is described herein by way of example for several embodiments and illustrative drawings, those skilled in the art will recognize that the invention is not limited to the embodiments or drawings described. It should be understood that the drawings and detailed description are not intended to limit the invention to the particular form disclosed but, on the contrary, the intention is to cover all modifications, equivalents, and alternatives falling within the spirit and scope of the present invention as defined by the appended claims. The headings used are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Exemplary Distributed Data Systems

Figure 1:
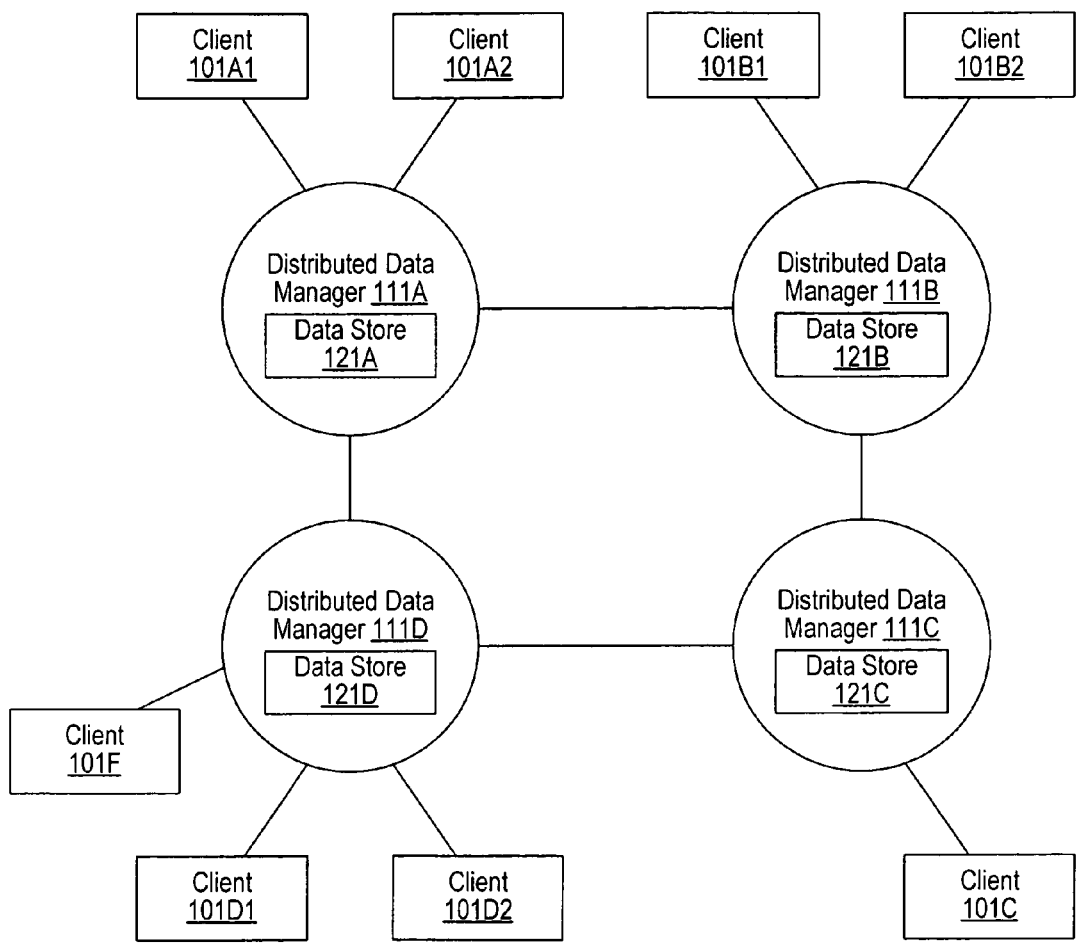
FIG. 1 illustrates a distributed data system.
Figure 2A:
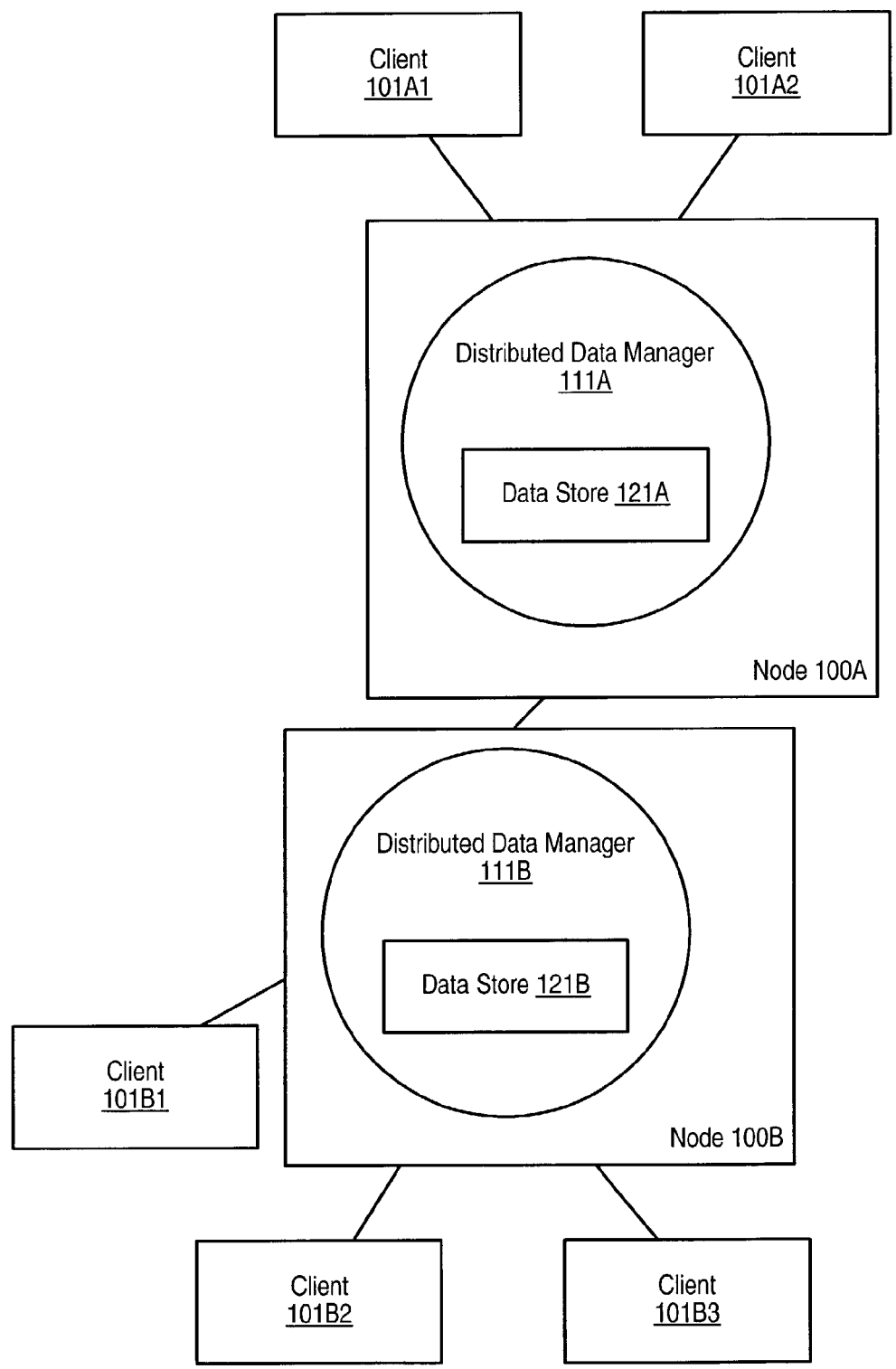
FIG. 2A illustrates a distributed data system that includes several in-process nodes, according to one embodiment.

FIG. 2A illustrates a distributed data system that includes two out-of-process nodes 100A and 100B. Node 100A is coupled to two clients 101A1 and 101A2. Node 100B is coupled to three clients 101B1, 101B2, and 101B3. Node 100A and 100B each include a distributed data manager 111 and a data store 121.

A client may be an application, applet, servlet, bean, etc. that uses, creates, or manipulates data within the distributed data system. For example, in one embodiment, a client 101 may be a web server handling web page requests received over an Internet connection. The distributed data manager 111 for the client's node may be comprised within an application server coupled to the web server client. In other embodiments, a client may be any client for managed data within a distributed data system, and the distributed data managers 111 may be stand-alone components or implemented as part of a server or any other suitable configuration for a distributed data system.

Each node may be implemented on a computing device, such as a server, computer, workstation, desktop, mainframe, laptop, hand-held device, etc. The nodes are networked together (e.g. through a LAN, WAN, the Internet, wireless network, etc., or combination thereof) to communicate data between nodes.

In the embodiment of FIG. 2A, nodes 100 operate in a different process than clients 101. Accordingly, whenever data is sent from a client 101 and nodes 100, the client may serialized the data before sending the data to the nodes 100. A receiving node 100 may store the data in data store 121 in serialized form. If the data is subsequently provided from the data store 121 to a client, the data may be transferred in serialized form. The receiving client may then de-serialize the data.

Figure 2B:
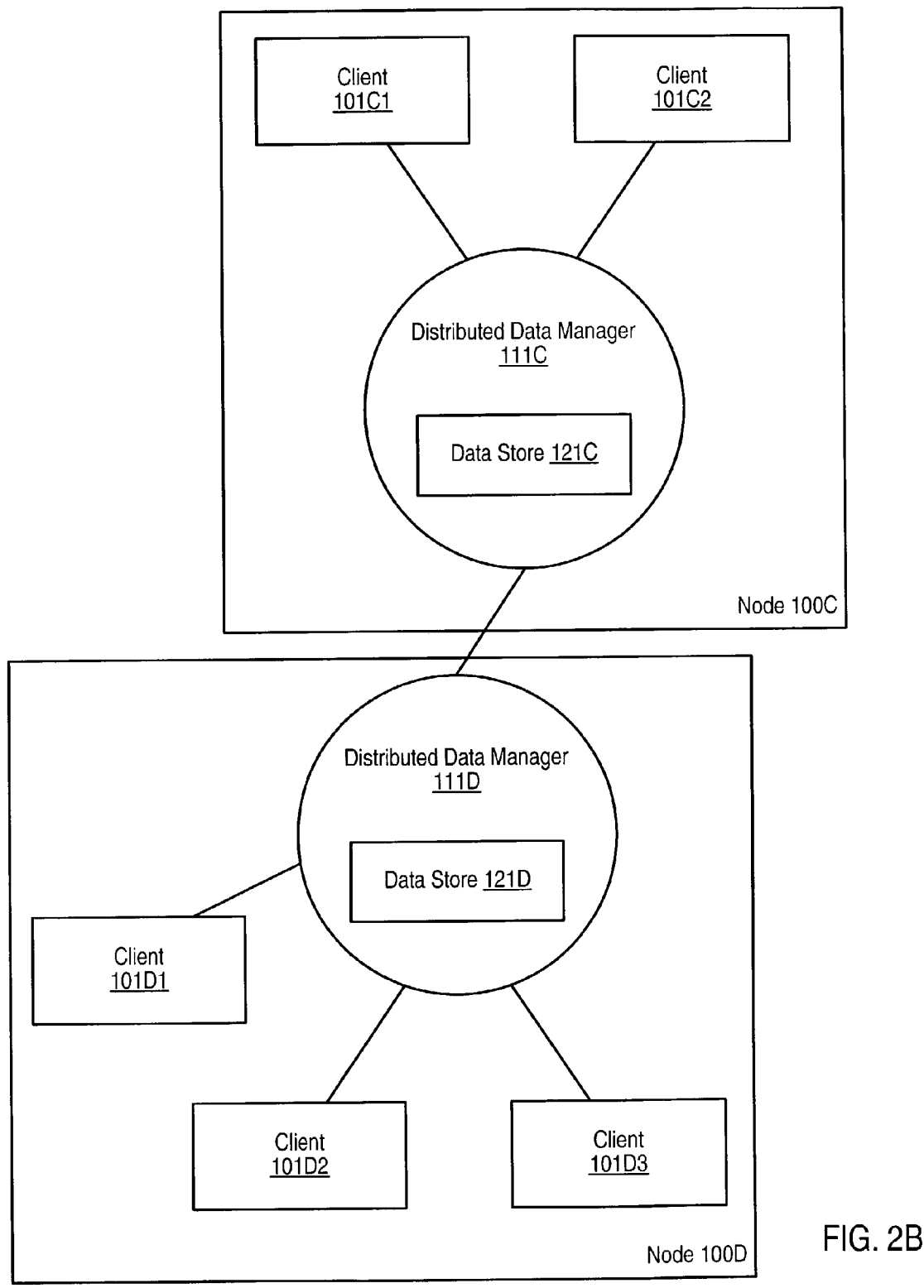
FIG. 2B illustrates a distributed data system that includes several out-of-process nodes, according to one embodiment.

FIG. 2B illustrates a distributed data system that is similar to FIG. 2A. However, FIG. 2B includes two in-process nodes 100C and 100D. Node 100C is coupled to two clients 101C1 and 101C2. Node 100D is coupled to three clients 101D1, 101D2, and 101D3. Node 100C and 100D each include a distributed data manager 111 and a data store 121.

In the embodiment of FIG. 2B, distributed data manager 111C operates in the same process as clients 101C1 and 101C2. Similarly, distributed data system manager 111D operates in the same process as clients 101D1, 101D2, and 101D3. Distributed data manager 111C operates in a different process than clients 101D, and distributed data manager 111D operates in a different process than clients 101C. Data sent between clients to a distributed data system manager in the same process may not be serialized. In contrast, data sent between distributed data managers 111C and 111D in different processes may be serialized prior to transfer. Data managers 111C and 111D may store data received from in-process clients in data store 121 as values or object references instead of storing additional serialized copies of the data in data store 121.

Note that the number of distributed data managers 111 and clients 101 shown in FIGS. 2A and 2B is merely exemplary. Other embodiments may include different numbers of each type of distributed data system component. Also note that in some embodiments, a distributed data system may include both in-process and out-of-process nodes, as is described in more detail below.

Incremental Data Updates in a Distributed Data System

In distributed data systems such as those shown in FIGS. 2A and 2B, the clients and distributed data managers may be configured to perform incremental data updates by subdividing each data object handled by the distributed data system into a hierarchy of sub-elements. If a data object is modified by a client 101, that client may only transfer the modified sub-element to a distributed data manager 111 to effect the update. This may reduce the amount of data being transferred between clients and the distributed data system managers. Additionally, this may reduce the cost of serializing and de-serializing data to be transferred between distributed data system components in different processes.

A distributed data system may handle several different types of data objects. Each different type of data object may require specialized handling in order to apply incremental updates specifying only a portion of the data object.

Figure 2C:
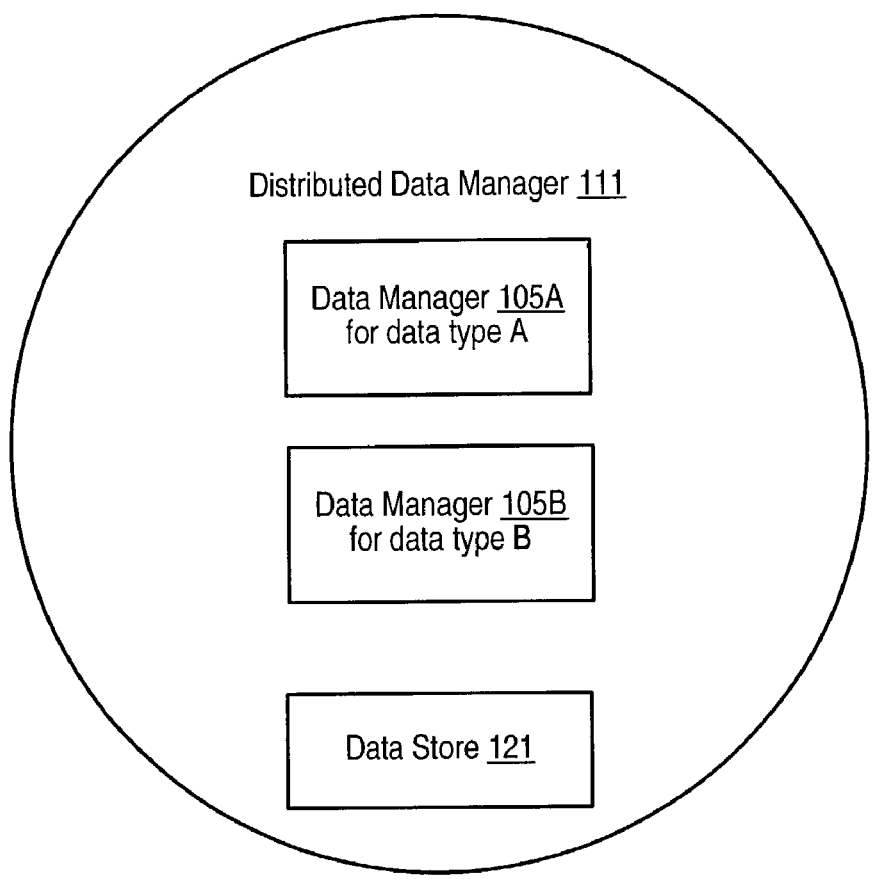
FIG. 2C shows a distributed data system manager that includes several data-type-specific data managers configured to perform incremental data updates, according to one embodiment.

FIG. 2C illustrates an exemplary distributed data manager 111 that may be implemented in one embodiment. In FIG. 2C, the distributed data manager 111 may include a data store 121 and several different data-type-specific data managers 105.

Here, data manager 105A is configured to handle data objects of type A. Similarly, data manager 105B is configured to handle data objects of type B. Data objects of type A may have a different composition, formatting, structure, and/or sub-element hierarchy than data objects of type B. For example, data objects of type A may be created and accessed during HTTP (Hyper Text Transfer Protocol) sessions with clients 101, while data objects of type B may be created and accessed during IIOP (Internet Inter-ORB Protocol) sessions. Other types of data objects that may be created and accessed include IORs (Interoperable Object References).

Each data manager 105 may be configured to perform operations that are specific to one type of data object. In some embodiments, data managers 105 may be implemented in object-oriented code in which the each data manager 105 is derived from an abstract data manager class. Each node 100 of a distributed data system may include an instance of each different data manager 105 needed to handle data object types that may be accessed at that node 100. Note that a node 100 that handles a single type of data may only include one data manager 105.

Figure 3:
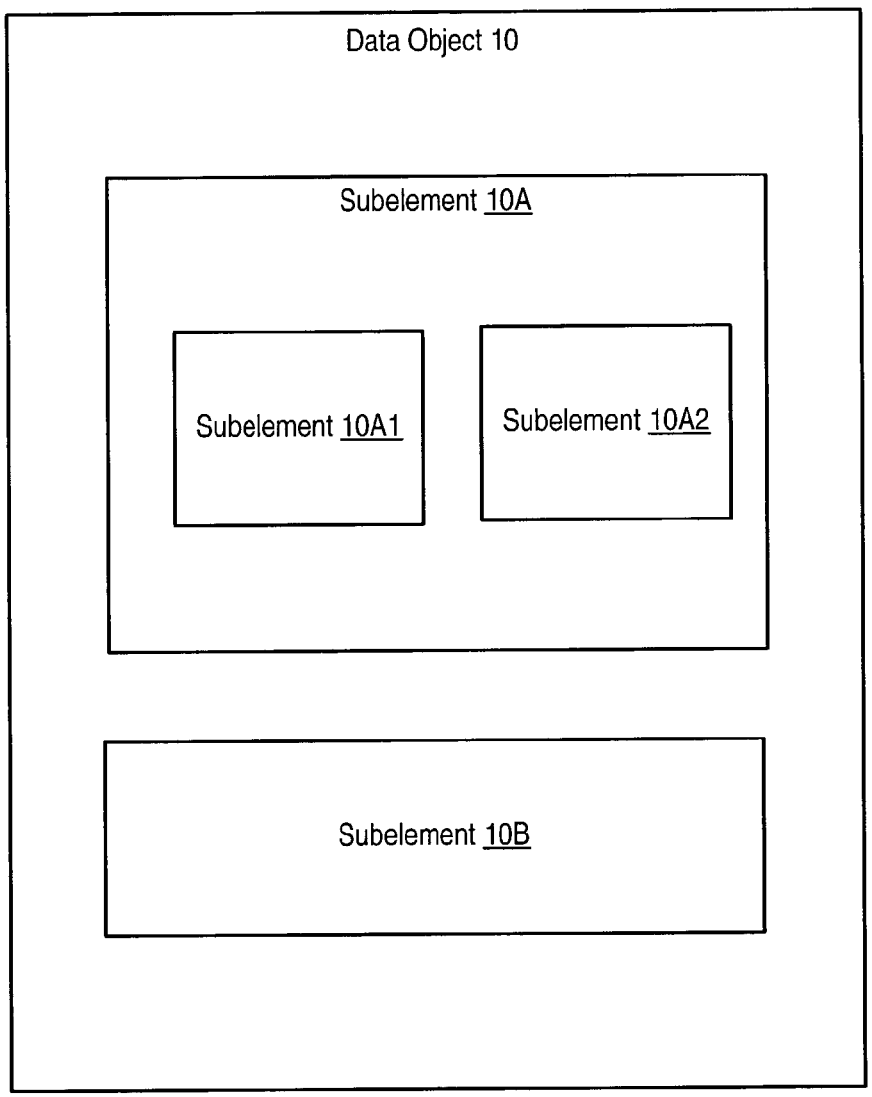
FIG. 3 illustrates how a data object may be subdivided into sub-elements, according to one embodiment.

FIG. 3 illustrates how a data object 10 may be subdivided in one embodiment. Here, a data object 10 includes two sub-elements 10A and 10B. Sub-element 10A is further subdivided into sub-elements 10A1 and 10A2. Note that these subdivisions are merely exemplary and that other subdivisions may be used. Note also that each data object stored in a given distributed data system may be different. When a subdivided data object 10 is stored in a data store 121 in a distributed data system, information identifying the sub-elements of that data object and their hierarchical relationship may also be maintained in the data store 121 or other memory or storage device within the distributed data system. For example, each data value, object reference, or unit of serialized data in a data object 10 may be tagged with information identifying the particular sub-element in which that data value, object reference, or unit of serialized data belongs.

A data object 10 may be subdivided into various sub-elements by a client 101 that is accessing that data object. The client 101 may use various criteria to determine how to subdivide data objects. For example, subdivisions may be based on the logical relationships between various portions of the data in the data object. For example, if a client is interacting with a distributed data manager as part of an HTTP session dealing with a purchase order, the client 101 may create different sub-elements in which to store the data relating to each line item of the purchase order. If a client is 101 accessing a data object that stores shopping cart information for the client, the client may use one sub-element of the data object to store data associated with books being placed in a shopping cart and another sub-element of the data object to store data associated with computer equipment being placed in a shopping cart. In some embodiments, each subdivision in a complex data object may store a data primitive.

Subdivisions may be based on how frequently each portion of the data object is updated. For example, if one portion of the data object is updated frequently relative to the rest of the data object, the client may store the frequently updated portion of data object in a separate sub-element. This may improve performance, since only the exact portion of the data object being frequently modified is transferred between the client and the distributed data manager to effect each update. Subdivisions may also consider data size. For example, if a client is adding a significant amount of data to a data object, the client may create a new subdivision in which to store the new data so as not to increase the size of an existing subdivision.

In some embodiments, clients 101 may be allowed to arbitrarily subdivide data objects into various sub-elements. The distributed data managers may thus support any subdivision generated by a client 101. In other embodiments, the distributed data system may support a limited number of fixed subdivisions of each type of data object. In these embodiments, clients may not be allowed to create subdivisions that vary from the fixed subdivisions supported by the distributed data managers.

Whenever a client 101 communicates with a distributed data manager 111 to access a data object stored by the distributed data system, the client may specify which sub-elements of that data object to access. For example, if the client 101 has updated a portion of the data object included in a particular sub-element, the client 101 may send the distributed data manager 111 a message specifying that sub-element and containing the updated value of that sub-element. Accordingly, if less than all of the data object is being updated, less than all of the data object may be specified and transferred between the client 101 and the distributed data manager 111. The client 101 may also access an entire data object by specifying the entire data object in a message to the distributed data manager 111. For example, the client 101 may specify the root of the hierarchy to specify the entire data object. Similarly, the client 101 may access more than one sub-element but less than all of the data object by specifying a portion of the data object hierarchy or by specifying each sub-element individually. For example, looking at FIG. 3, a client 101 may access sub-elements 10A1 and 10A2 by specifying sub-element 10A of data object 10. Similarly, a client 101 may access sub-elements 10A1 and 10B by specifying each sub-element individually in a message sent to a distributed data manager 111.

Distributed data managers 111 may perform incremental data updates similarly to clients 101 by specifying and transferring less than all of a data object in response to a portion of the data object being updated. Distributed data managers 111 may also specify and transfer entire data objects when performing operations such as data replication within a distributed data system. For example, if a client 101 updates a sub-element of a data object by communicating the updated value of that sub-element (as opposed to the value of the entire data object) to a distributed data manager 111, that distributed data manager 111 may store the updated value of the sub-element in its data store 121. If the data object is replicated by in another distributed data system node, that distributed data manager may send the updated value of the sub-element to the distributed data manager in the replicating node.

A data-type specific data manager 105 in each node 100 may include an interface configured to perform accesses to data objects of a particular type based on which sub-elements of that data object are specified by a distributed data manager 111 or client 101 requesting the access. For example, if a distributed data manager 111 reads an entire data object by specifying the highest level of that data object's hierarchy, the data-type specific data manager 105 may read the entire data object from a data store 121 and return a copy of that data object to the requesting distributed data manager 111. If instead a client 101 writes to one of several sub-elements included in the data object, the data-type specific data manager 105 may store the new value of the specified sub-element in the data object without updating any other sub-elements within the data object.

FIG. 4 illustrates an exemplary message format that may be used to communicate between clients 101 and distributed data managers 111 in one embodiment. As shown in FIG. 4, a message 20 may include a URL (Uniform Resource Locator) 22, a URI (Uniform Resource Identifier) 24, an operation flag 26, and data 28.

A URL 22 may be used by a distributed data manager 111 to determine which data manager 105 should be used to handle the access requested in the message 20. For example, the distributed data manager 111 may track (e.g., in a lookup table) which URLs 22 are associated with each data manager 105. In response to receiving a message specifying a particular URL 22, the distributed data manager 111 may forward that message to the data manager 105 associated with that particular URL.

In one embodiment, the URL 22 may include a data manager field 22A, an ID field 22B, and a unique data key 22C, as shown in FIG. 4. The data manager field 22A indicates which data manager 105 should handle the message 20. In one embodiment, the data manager field 22A may directly identify one of the data managers 105. In other embodiments, this field 22A may indirectly identify one of the data managers 105 (e.g., the distributed data manager 111 may use the information in this field to access a lookup table that indicates which data manager 105 should handle the message). A URL may also include additional information that is not used to identify a particular data manager. For example, the ID field 22B may include a session ID in some embodiments. The unique data key 22C may contain information that, given the information in the data manager field 22A and session ID 22B, uniquely identifies a particular data object. Note that other embodiments may include different and/or additional information in each URL 22.

A data manager 105 may use the URI 24 to identify which portion or portions of a particular data object to access. In one embodiment, URI 24 may be specified in the format "/sub-element/sub-element/ . . . " For example, sub-element 10A1 in FIG. 3 may be specified as "/sub-element 10A/sub-element 10A1. All of the sub-elements in data object 10 may simply be specified as "/". Note that the format and content of URI 24 may vary. For example, in embodiments in which the URL 22 does not identify the data object, the URI 24 may instead identify both the data object and the sub-elements of that data object to which access is requested.

The operation flag 26 may specify the type of access to perform on the identified portion or portions of the data object. For example, in one embodiment, types of accesses that may be performed may include creating a new sub-element, updating or modifying an existing sub-element, and removing an existing sub-element.

The data field 28 in message 20 may contain the data to be stored in a data object sub-element identified in the URI field 24 when the operation flag field 26 indicates that a sub-element is being created or updated. The data field 28 may not contain any data (i.e., the data field 28 may be null) when the operation flag field 26 indicates that a sub-element is being created or removed. Note that when a sub-element is created, the client 101 creating that sub-element may selectively store or not store data in that sub-element at creation time.

In some embodiments, multiple URIs 24 may be specified in each message 20. Additionally, a different operation flag 26 and different data 28 may be specified for each URI 24 included in the message 20.

Figure 5C:
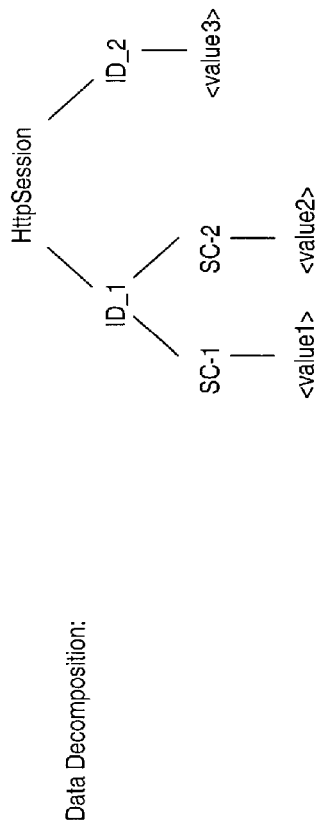

FIGS. 5A-5D illustrate an exemplary data object and show how that data object may be accessed using incremental updates, according to one embodiment. In FIG. 5A, a message is sent to create a sub-element within an HTTP session data object. The URL of the message may include information identifying a data manager, session ID, and a particular data object within the session identified by the session ID in one embodiment. Here, the URL is shown as simply identifying a data object "HttpSession." The distributed data system node that receives this message may use the URL to select which data-type-specific data manager should handle the message.

The message in FIG. 5A specifies an object flag "insert," indicating that a new sub-element of the data object HttpSession is being created. In this example, the URI specifies "/ID_1'. For example, a client may create a subdivision in the data object to store data accessed during a session having a session identifier of ID_1. In response to receiving the message, the data manager identified in the URL creates a sub-element ID_1 within HttpSession, as illustrated in the depiction of the data decomposition of FIG. 5A. Since no data is specified in the data field of the message, the sub-element ID_1 does not contain any data at creation time.

In FIG. 5B, a client sends several messages to a distributed data system node requesting various accesses to different sub-elements within the HttpSession data object. These messages are routed to the same data-type-specific data manager as the message in FIG. 5A since they specify the same URL. Upon receipt of the first message, this data manager removes sub-element ID_1 from the data object. Upon receipt of the second message, the data manager reinserts sub-element ID_1 and also inserts sub-elements /ID_1/SC-1 and /ID_1/SC-2. Sub-element/ID_1/SC-1 is inserted with a value of value1 and/ID_1/SC-2 is inserted with a value of value2. Sub-elements SC-1 and SC-2 may each correspond to shopping cart data generated during session ID_1, for example.

FIG. 5C illustrates how a client may add another sub-element of data object HttpSession. Here, a message is sent specifying that a new sub-element, ID_2, is to be inserted with a value of value3. This message may be sent, for example, if a client stores data associated with a different session ID (here, ID_2) into the same data object as the data from session ID_1.

Figure 5D:
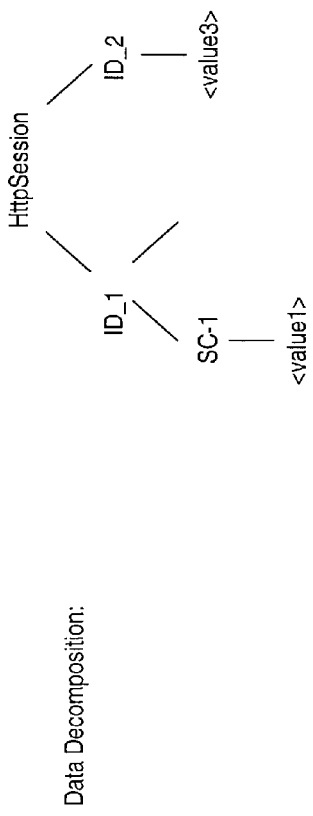

In FIG. 5D, a client removes the/ID_1/SC-2 sub-element from the data object HttpSession by sending a message to a distributed data manager. Again, the distributed data manager forwards the message to the data-type-specific data manager associated with URL HttpSession. This data manager then removes the sub-element /ID_1/SC-2 from the data object.

Figure 6:
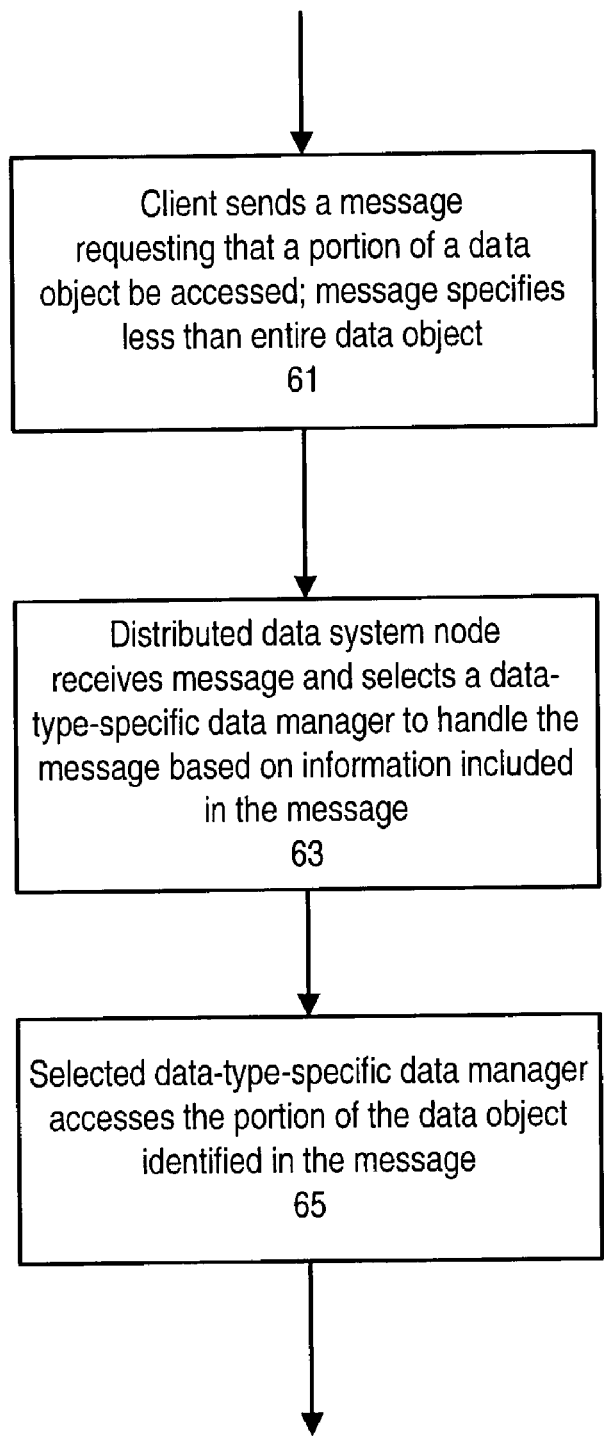
FIG. 6 is a flowchart of a method of performing incremental data updates in a distributed data system, according to one embodiment.

FIG. 6 is a flowchart of one embodiment of a method of performing incremental data updates in a distributed data system. At 61, a client sends a message requesting that a portion of a data object be accessed. The message specifies less than the entire data object. The client may encode information in the message identifying which sub-element of the data object includes the portion to which access is requested. The client may also encode information (e.g., a URL as described above) in the message that is used to identify a data-type-specific data manager used to handle the type of data object being accessed. If the client is updating the portion of the data object, the client may include the new value of the sub-element (but not the new value of the entire data object).

A node in the distributed data system receives the message from the client and uses information in the message to select one of several data-type-specific data managers to handle the message, as shown at 63. For example, the node may use a URL in the message to access a lookup table that associates each URL with a particular one of the data-type-specific data managers. Alternatively, the information itself may explicitly identify which data-type-specific data manager should handle the message, making additional processing by the distributed data system node unnecessary. In one embodiment, the node may include different data-type-specific data managers to handle HTTP session data objects, IIOP session data objects, and IOR data objects.

At 65, the selected data-type-specific data manager accesses the portion of the data object identified in the message. If the data object is subdivided into a hierarchy of sub-elements, the message may specify which sub-element within the hierarchy includes the portion of the data object to be accessed. The data-type-specific data manager may use this information to access the data object.

Figure 7:
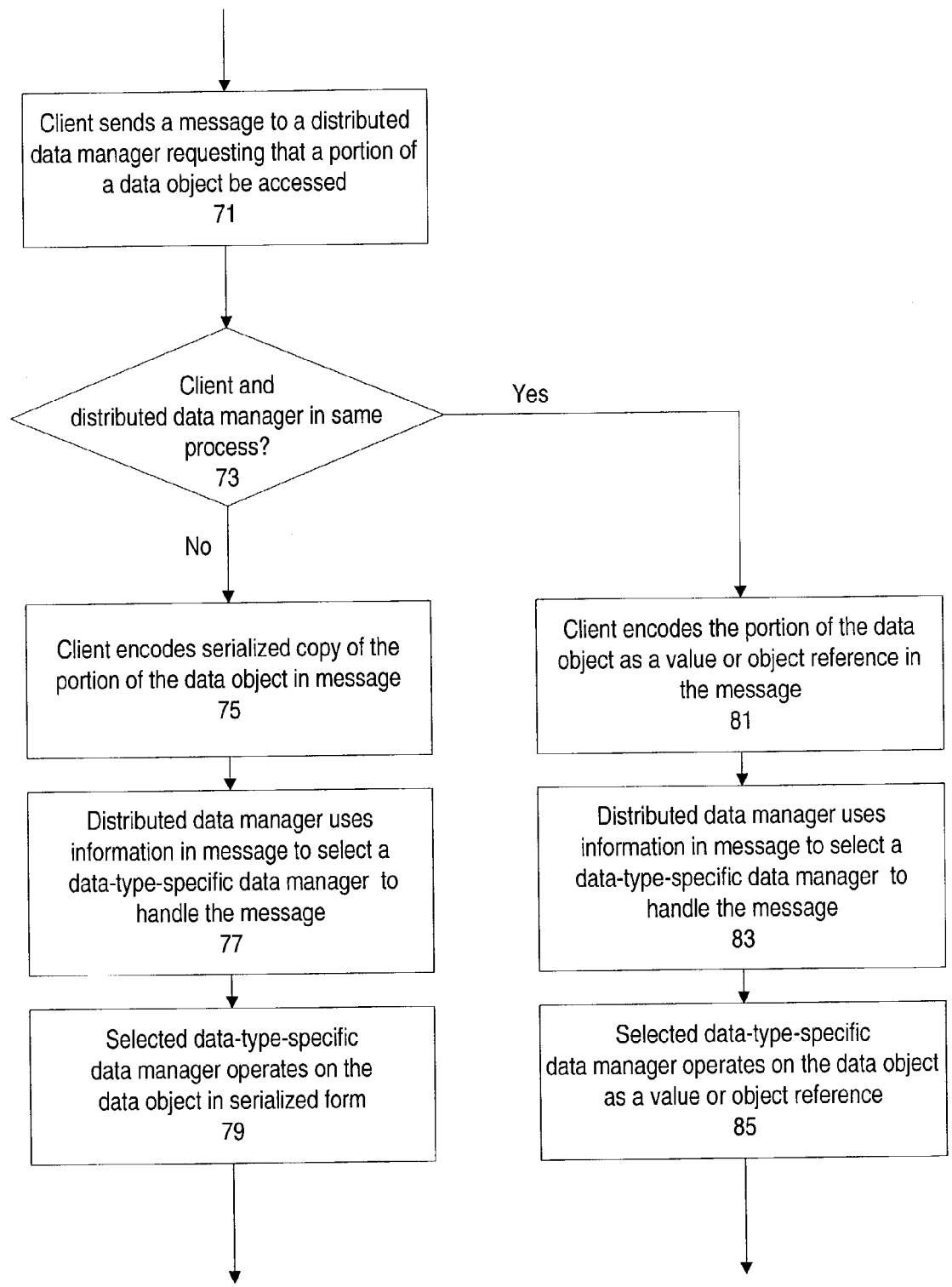
FIG. 7 is a flowchart of another method of performing incremental data updates in a distributed data system, according to one embodiment.

FIG. 7 shows another embodiment of a method of performing incremental updates in a distributed data system. At 71, a client sends a message requesting access to a portion of a data object stored by a distributed data system to a distributed data manager. As in FIG. 6, the client may encode information identifying which of several sub-elements of the data object includes the portion of the data object being accessed.

If the client is updating the portion of the data object to have a new value, the client may include the portion of the data object in the message, as shown at 73 and 81. For example, if the client and the distributed data manager are in the same process, as determined at 73, the client encodes the portion of the data object to be updated in the message as a value or object reference, as shown at 81. If instead the client and the distributed data manager are not in the same process, the client may serialize the portion of the data object to be updated and encode this serialized copy in the message, as indicated at 75. In both functions 75 and 81, the client encodes less than all of the data object in the message. Note that when requesting certain types of accesses (e.g., creation and deletion), the client may not encode any data in the message.

At 77, the distributed data manager uses information (e.g., a URL) included in the message to select one of several data-type-specific data managers to handle the message. The selected data-type-specific data manager operates on the data object, as indicated at 79. The data object is stored in serialized form, and thus the selected data-type-specific data manager is configured to operate on the data object in this form.

In-process functions 83 and 85 operate similarly to out-of-process functions 77 and 79. At 83, the distributed data manager selects one of several data-type-specific data managers to handle the message based on information included in the message. Then, at 85, the selected data-type-specific data manager accesses the data object as specified in the message. Here, the data-type-specific data manager operates on the data object in a non-serialized form (e.g., the portion of the data object may be stored as a value if the portion of the data object is a data primitive or an object reference if the portion of the data object is more complex).

Note that the functions shown in FIGS. 6 and 7 may also be performed in response a distributed data manager (as opposed to a non-distributed data manager client) sending a message requesting access to particular sub-element(s) of a data object to another distributed data manager in the distributed data system. In situations in which one distributed data manager is initiating an access to a copy of a data object in another distributed data manager's data store, the distributed data manager may be considered a client of the other distributed data manager.

Distributed Data System with Both In-Process & Out-Of-Process Nodes

Figure 8:
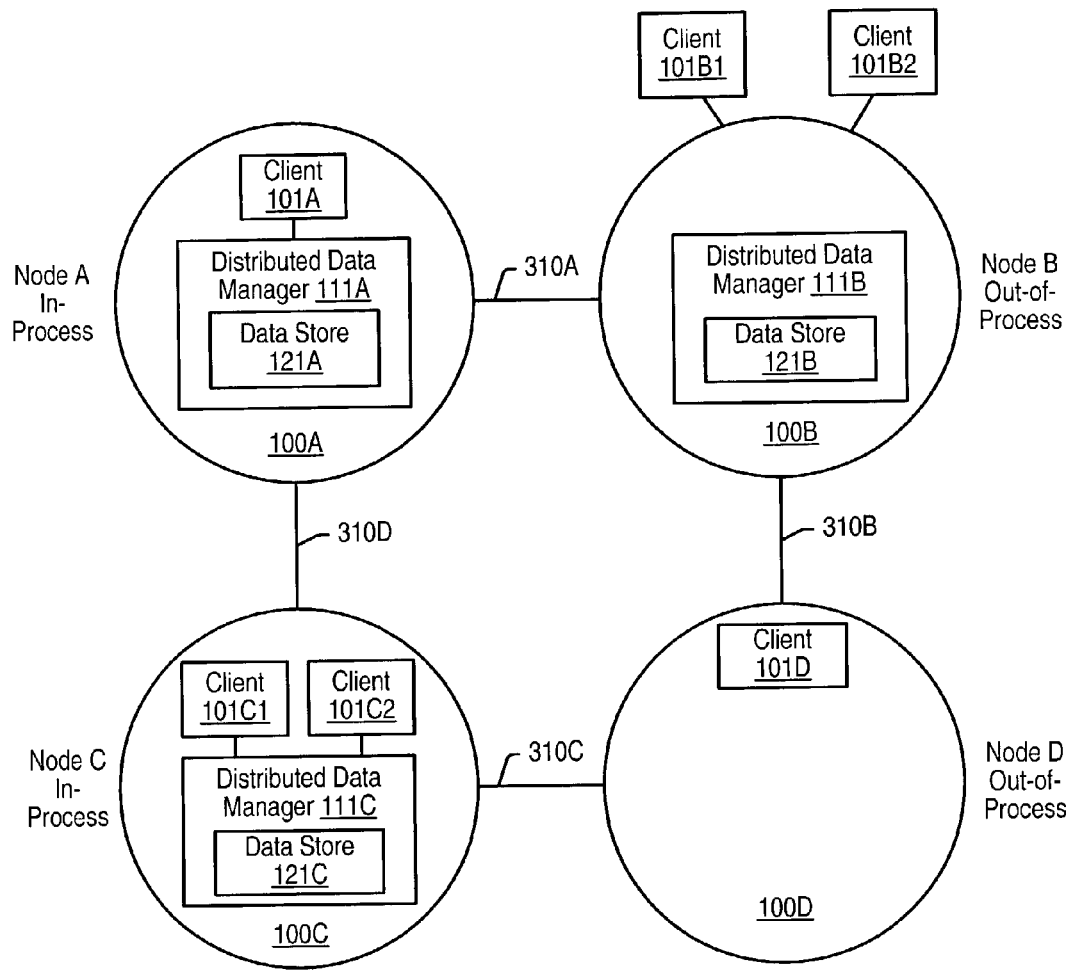
FIG. 8 shows a distributed data system that includes both in-process and out-of-process nodes, according to one embodiment.

FIG. 8 illustrates a distributed data system, according to one embodiment. Four nodes of the distributed data system, nodes A-D, are illustrated coupled together in a ring topology using links 310. Links 310 may be a network connection between the nodes. Note that while only four nodes are illustrated, the distributed data system may include fewer or more nodes. Also, note that while the nodes are illustrated as coupled in a ring topology, any other suitable network topology for a distributed data system may be employed. Some nodes may include a distributed data manager 111 configured to implement a distributed data management system among the nodes. For example, the distributed data managers 111 within the nodes may ensure data availability for the system by replicating data stored in a node on one or more other nodes. If a node fails, one or more nodes storing the replicated data from the failed node may service requests for that data in order to maintain data availability, and may recreate the failed node. Distributed data managers 111 may also provide for load balancing and other data management functions as are found in conventional distributed data systems. One or more clients 101 may be associated with each node.

Each node is configured as either an in-process node or an out-of-process node. For example, in FIG. 8, nodes A and C are configured as in-process nodes and nodes B and D are configured as out-of-process nodes. If a node is configured as an in-process node, the client(s) 101 for that node execute within the same process as the distributed data manager 111 for that node. If a node is configured as an out-of-process node, the client(s) 101 for that node execute within a separate process. For out-of-process node B, the associated clients 101B1 and 101B2 may also be considered to be separate out-of-process nodes. As will be explained in further detail below, by allowing both in-process and out-of-process configurations, data communication efficiency may be improved while allowing increased node configuration flexibility.

The manner by which data is communicated within the distributed data system depends upon the type of node handling the data communication. All distributed data communications between nodes and all distributed data communications for out-of-process nodes cross a process boundary. Therefore, the object being communicated is serialized by the sending process and then sent in a serialized format to the requesting node or client. Also, data received and stored by a distributed data manager 111 for an out-of-process node may be stored in a serialized format since any later requests for that data will be out-of-process requests. For in-process nodes, data communications may be handled within the node without serialization/deserialization since the clients and distributed data manager execute within the same process. For distributed data communications in an in-process node, data may be passed in object format or as an object reference without any serialization or deserialization. Several examples are given as follows to highlight how data requests are handling for in-process and out-of-process nodes.

When a client within an in-process node stores data in the in-process node, the data store request may be sent to the distributed data manager for that node. For example, referring to FIG. 8, client 101A may request a data store operation to distributed data manager 111A in in-process node A. Client 101A and distributed data manager 111A both execute within the same process 100A. Distributed data manager 302A is configured to operate in an in-process mode. Thus, the data for the data store operation may be passed from client 101A to distributed data manager 111A as an object or merely as an object reference. Distributed data manager 111A may store the object or object reference in its data store 121A. Since client 101A and distributed data manager 111A operate within the same process 100A, no extra serialized copy of the data need be created for local storage in data store 121A. A serialized copy may be created for distributed storage within another node since the data will be transmitted to another node through an out-of-process communication. For example, distributed data manager 111A may generate a serialized copy of the data for transmission to distributed data manager 111B.

A client may request data within its local node. For example, client 101A may request data from distributed data manager 111A. Since distributed data manager 111A is configured to operate in the in-process mode, the distributed data manager 111A returns the requested data to client 101A in an object format or as an object reference. If the requested data is present in data store 121A of the distributed data manager 111A, the data object may be returned without need to access another node. However, if the requested data is not locally stored by distributed data manager 111A, distributed data manager 111A will retrieve the requested data from another node. Since retrieving the requested data from another node involves an out-of-process communication, the requested data will be received by distributed data manager 111A in a serialized format. Distributed data manager 111A will deserialize the received data into an object format storing the object in its data store 121A and returning the object or object reference to the requesting client 101A.

When a client communicates with an out-of-process node, the communication will involve serialization/deserialization of data since the communication crosses process boundaries. For example, referring to FIG. 8, to store data in its out-of-process node, out-of-process client 101B1 would serialize the data and send the serialized data to its local distributed data manager 111B in out-of-process node 100B. Distributed data manager 111B would receive the serialized data and store data in its data store 121B. In one embodiment, if the distributed data manager 111 is configured for out-of-process mode, the data would be stored "as is" in its serialized format.

If an out-of-process client requests data, the data may be returned to the client in serialized format and the client will deserialize the data. For example, client 101B2 may request data from its local distributed data manager 111B. If the data is present in local data store 121B, distributed data manager 111B will return the serialized data to client 101B2. Note that since the data may already be stored in serialized format, distributed data manager 111B will not need to perform additional serialization on the data (although some serialization may be required for other message components in the communication between distributed data manager 111B and client 101B2). If the requested data is not locally present, that data may be requested from another node. The requested data will be received in a serialized format from another node having the data. The data may then be locally stored "as is" (serialized) by distributed data manager 111B and returned to client 101B2.

Some nodes may not include a distributed data manager 111. For example, node D of FIG. 8 illustrates an example of a node that does not include a distributed data manager. However, such nodes may still include one or more clients 101. Such nodes will essentially operate as out-of-process nodes since the clients will have to communicate across process boundaries to access data in the distributed data system. Such clients may have their own local data stores that are not part of the distributed data system (e.g. do not participate in the data availability, load balancing, etc. functionality provided by distributed data managers 111). Such out-of-process nodes will receive data from and send data to other nodes in the distributed data system in serialized format.

In one embodiment of the distributed data system, each node is not aware of the operating mode (in-process or out-of-process) of the other nodes. Each node may be responsible for handling data accesses according to its configuration. A node does not need to be aware of the node configuration when communicating with other nodes since all inter-node communications cross process boundaries and thus involve serialization of data at the sending node. It may be up to the receiving node to decide how to handle the data according to whether or not the node is an in-process or out-of-process node.

Thus, when data is received at a receiving node, the node may be responsible for ensuring that the data is stored correctly into the node's data store. If the receiving node is operating in the in-process mode then the distributed data manager for that node may deserialize the data to recreate the object and then store the object in its data store. If the receiving node is in the out-of-process mode, the serialized data may be stored "as is" in the local data store, in one embodiment.

When a client requests data from the distributed data manager 111 for a node, the distributed data manager 111 may first check to see if the requested data is present in its data store 121. If a match is found then the operating mode of the distributed data manager may determine the manner in which the data is returned to the client. If the distributed data manager 111 is in the in-process mode then the data may be returned back to the client as an object. If the distributed data manager is operating in the out-of-process mode, the data is returned to the client in a serialized format. The client may then have to deserialize the data to reconstruct the object. If a distributed data manager 111 is not able to find the requested data in its data store, then the distributed data manager may request the data from the other nodes in the distributed data system topology. If the data is found in any of the other nodes then the data may be transferred from that node to the requesting node in serialized format. The requesting node may then store the data in its data store (according to the operating mode for that node) and send the data to the requesting client.

Thus, a distributed data system may include nodes configured to operate in either an in-process or an out-of-process mode. The operating mode for each node may determine how data communications are handled within that node. For example, the manner in which data requests are handled for clients of that node and the manner by which data is stored in the node may depend on the operating mode of the node. A distributed data manager within a node may be configured to operate according to the in-process or out-of-process mode and handle client data operations accordingly. The distributed data manager may also perform data replication operations to other nodes to ensure availability and perform other distributed data functions with other nodes, such as load balancing, etc.

Distributed data managers 111 may provide one or more distributed data functions. For example, the data store of a distributed data manager receiving a request to store data may not have room to store the entire data needing storage. In one embodiment a distributed data manager may de-allocate space used by other data to use for storing the new data needing storage. In that embodiment, a distributed data manager may ensure that at least one copy of data to be overwritten exists in another data store in the distributed data system. For example, the distributed data manager may communicate with other distributed data managers with copies of data to be overwritten by the distributed data manager to indicate that the distributed data manager will overwrite its local copy. Other distributed data managers may make additional copies of the data within the distributed system to ensure high availability. The distributed data manager may also send a copy of its local data to another distributed data manager in the distributed data system. These data communications may be performed for out-of-process and in-process nodes in a distributed data system as described above. In one embodiment, various other techniques for ensuring data preservation and high availability may be used.

In one embodiment, a distributed data manager may be implemented as a sessionStore on a computer with access to a network, for example the Internet. The data store may contain information regarding a user session, transactions between a server and client, or any data. In one embodiment, a client application may use a sessionStore implementation of a distributed data manager. In one embodiment, the client application and distributed data manager may function out-of-process. For example, an application server, a web server, both, or other Internet systems may function as clients to the distributed data manager, either on the same or different machines. Other applications or distributed data managers may be able to access the information stored in a relevant data store. In another node, a sessionStore may operate as the distributed data manager while sharing its process space with a web server process. In that embodiment, the distributed data manager may be considered in-process. Other applications such as an application server may interact with the web server through their own distributed data managers to get the relevant data. In one embodiment, a cluster may include a distributed data manager implemented as a sessionStore operating in-process on a server with a client application and a distributed data manager implemented as a sessionStore operating out-of-process on another server.

According to one embodiment of the present invention, additional nodes configured to operate within a distributed system either as in-process or out-of-process may join a distributed system including either or both of the in-process or out-of-process sessionStore distributed data manager. Also according to one embodiment, additional storage space may be added to the distributed system by including in the distributed system additional distributed data manager nodes. In one embodiment, a node in the distributed system may not have any clients but include a distributed data manager. That node may be considered out-of-process. In such an embodiment, all data in the node's data store is serialized since its communications of data would be across process boundaries. In one embodiment, a client node may operate in the distributed system without a distributed data manager, essentially functioning out-of-process. In such an embodiment, the client node may depend on another node and its distributed data manager for access to the distributed data system.

Various embodiments may further include receiving, sending or storing instructions and/or data implemented in accordance with the foregoing description upon a computer accessible medium. Generally speaking, a computer accessible medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Figure 9:
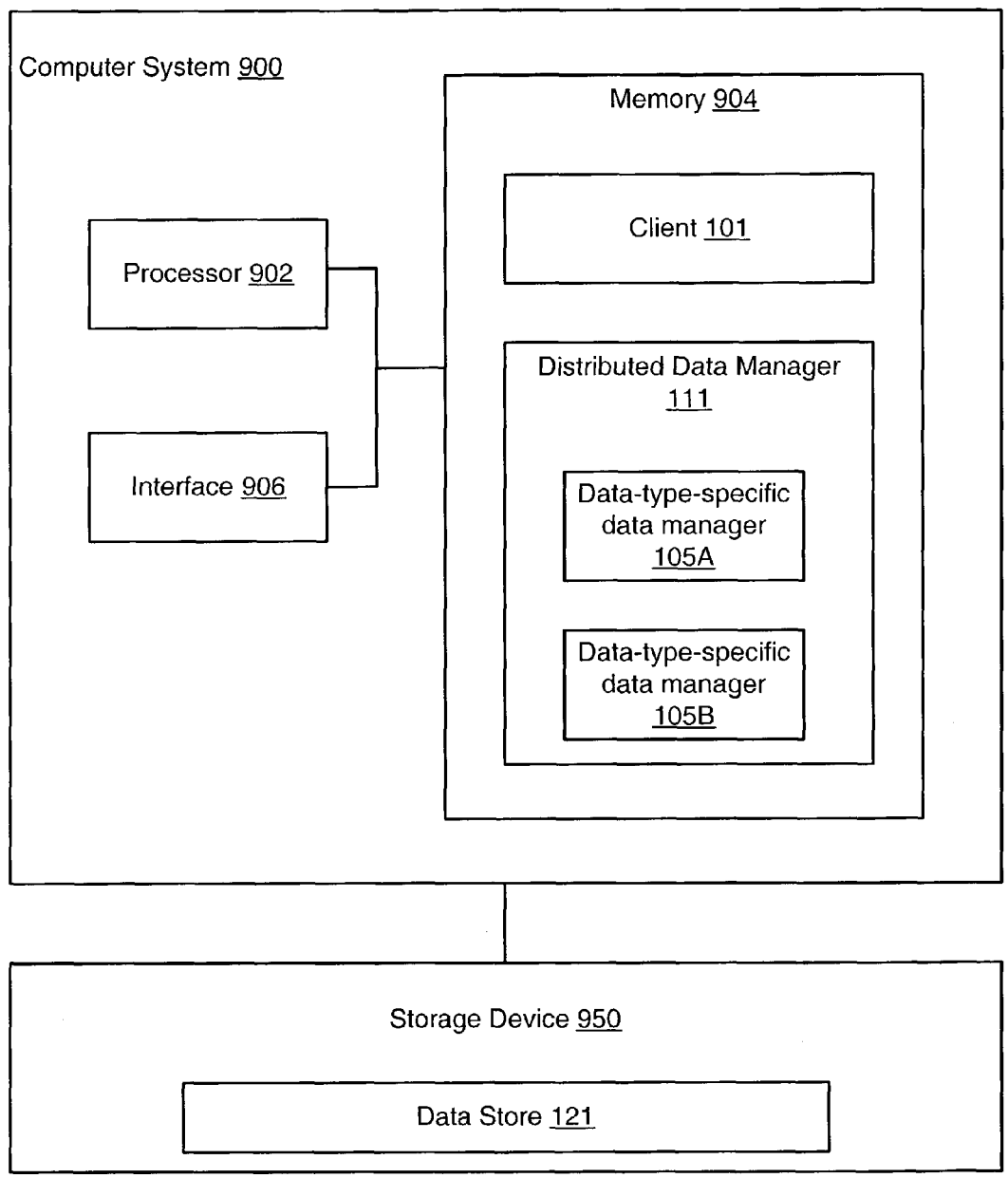
FIG. 9 is a block diagram of a computer system configured to perform incremental data updates, according to one embodiment.

FIG. 9 illustrates of a computer system 900 that may be included in a distributed data system configured to perform incremental data updates, as described above. The computer system 900 may include one or more processors 902, system memory 904, and one or more interfaces 906 (e.g., network interface cards). The memory 904 is an example of a computer accessible medium as described above. The memory 904 may store data and program instructions executable by the processor 902 to implement one or more clients 101 in some embodiments. Clients 101 may be configured to perform incremental data updates by subdividing data objects into sub-elements and/or by specifying individual sub-elements of a data object in access requests sent to a distributed data manager.

The memory 904 may also (or alternatively) store data and program instructions executable by the processor 902 to implement a distributed data manager 111. As shown in FIG. 9, such a distributed data manager 111 may include several data-type-specific data managers 105 that are each configured to handle access requests targeting a particular type of data object. The distributed data manager 111 may use information in each message received from a client to select which data-type-specific data manager 105 should perform an access requested in that message. In some embodiments, distributed data manager 111 may access data store 121 implemented in a storage device 950 (e.g., one or more disk drives or a group of disk drives operated in a RAID (Redundant Array of Independent Disks) configuration) via interface 906. Similarly, a distributed data manager 111 may communicate with other distributed data managers in the distributed data system via interface 906.

It will be appreciated by those of ordinary skill having the benefit of this disclosure that the illustrative embodiments described above are capable of numerous variations without departing from the scope and spirit of the invention. Various modifications and changes may be made as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A distributed data system, comprising:
   a client; and
   a distributed data manager coupled to the client, wherein the distributed data manager includes a plurality of data-type-specific data managers and a data store configured to store a data object that includes a plurality of sub-elements;
   wherein the client is configured to update a portion of the data object by sending a message to the distributed data manager, wherein the message specifies one of the plurality of sub-elements of the data object to be updated and includes a new value of the one of the plurality of sub-elements but does not include a new value of the entire data object;
   wherein the distributed data manager is configured to select one of the plurality of data-type-specific data managers to handle the message dependent on a data-type of the one of the plurality of sub-elements;
   wherein the selected one of the plurality of data-type-specific data managers is configured to perform updates to the data object in the data store dependent on which of the plurality of sub-elements of the data object is specified by the client;
   wherein the client is configured to encode a URL (Uniform Resource Locator) in the message, and wherein the distributed data manager is configured to use information included in the URL to select one of the plurality of data-type-specific data managers to handle the message; and
   wherein the URL includes a data manager identifier, a session identifier, and a unique data key.

2. The system of claim 1, further comprising an additional distributed data manager;
   wherein the distributed data manager is configured to send an additional message specifying the one of the plurality of sub-elements of the data object to be updated to the additional distributed data manager, wherein the additional message includes the new value of the one of the plurality of sub-elements but does not include a new value of the entire data object;
   wherein the additional distributed data manager is configured to update the one of the plurality of sub-elements included in a replicated copy of the data object in response to receiving the additional message.

3. The system of claim 1, wherein the distributed data system comprises a plurality of distributed data managers coupled to form a cluster, and wherein the distributed data manager is included in the plurality of distributed data managers.

4. The system of claim 1, wherein the distributed data manager operates in a different process than the client.

5. The system of claim 4, wherein the selected one of the plurality of data-type-specific data managers is configured to update the data object in serialized form in the data store.

6. The system of claim 1, wherein the distributed data manager operates in a same process as the client.

7. The system of claim 6, wherein the selected one of the plurality of data-type-specific data managers is configured to update the data object in the data store as one of: a value and an object reference.

8. The system of claim 1, wherein the URL identifies the data object.

9. The system of claim 1, wherein the client is configured to encode a URI (Uniform Resource Identifier) in the message, wherein the distributed data manager is configured to use the URI to identify which one of the plurality of sub-elements of the data object to access in response to the message.

10. The system of claim 9, wherein the URI identifies the one of the plurality of sub-elements within a hierarchy organizing the plurality of sub-elements.

11. The system of claim 1, wherein the client is configured to encode an operation flag in the message, wherein the selected one of the data-type-specific data managers is configured to use the operation flag to select a type of access to perform to the one of the plurality of sub-elements.

12. The system of claim 11, wherein client is configured to encode an operation flag value indicating one of: create, update, or delete.

13. The system of claim 1, wherein the distributed data system manager is included in an application server, and wherein the client is a web server coupled to the application server.

14. A computer-implemented method, comprising:
   a client encoding a URL (Uniform Resource Locator) in a message to a distributed data manager specifying a portion of a data object to be updated, wherein the URL includes a data manager identifier, a session identifier, and a unique data key, and wherein the message includes a new value of the portion of the data object but does not include a new value of the entire data object;
   the client sending the message to the distributed data manager;
   the distributed data manager selecting one of a plurality of data-type-specific data managers to handle the message dependent on a data-type of the portion of the data object specified in the message received from the client, wherein the selecting comprises the distributed data manager using information included in the URL to select the one of the plurality of data-type-specific data managers to handle the message; and
   the selected one of the plurality of data-type-specific data managers updating the data object in a data store included in the distributed data manager dependent on which portion of the data object is specified in the message received from the client.

15. The method of claim 14, further comprising:
in response to receiving the message, the distributed data manager sending an additional message to an additional distributed data manager, wherein the message specifies the portion of the data object and includes the new value of the portion of the data object but does not include the new value of the entire data object;
the additional distributed data manager updating the portion of a replicated copy of the data object in response to receiving the additional message.

16. The method of claim 14, further comprising the client operating in a different process than the distributed data manager.

17. The method of claim 16, wherein said updating comprises the selected one of the plurality of data-type-specific data managers updating the portion of the data object in serialized form.

18. The method of claim 14, further comprising the distributed data manager operating in a same process as the client.

19. The method of claim 18, wherein said updating comprises the selected one of the plurality of data-type-specific data managers updating the potion of the data object as one of: a value or an object reference.

20. The method of claim 14, wherein the URL identifies the data object.

21. The method of claim 14, further comprising the client encoding a URI (Uniform Resource Identifier) in the message; wherein said accessing comprises the distributed data manager using the URI to identify which one of a plurality of sub-elements of the data object includes the portion of the data object.

22. The method of claim 21, wherein the URI identifies the one of the plurality of sub-elements within a hierarchy organizing the plurality of sub-elements.

23. The method of claim 14, further comprising:
the client encoding an operation flag in the message;
the distributed data manager using the operation flag to select a type of access to perform to the portion of the data object.

24. The method of claim 23, wherein said encoding comprises encoding an operation flag value indicating one of: create, update, or delete.

* * * * *